March 27, 1934.   B. M. SMITH   1,952,185

MAGNETIC TESTING DEVICE

Filed Aug. 19, 1932

Inventor:
Benjamin M. Smith,
by Charles E. Tullar
His Attorney.

Patented Mar. 27, 1934

1,952,185

UNITED STATES PATENT OFFICE 1,952,185

MAGNETIC TESTING DEVICE

Benjamin M. Smith, Schenectady, N. Y., assignor to General Electric Company, a corporation of New York Application August 19, 1932, Serial No. 629,460

3 Claims. (Cl. 175—183)

My invention relates to magnetic testing devices and concerns particularly arrangements for testing the percentage of iron or other magnetic materials in a sample of non-magnetic material.

It is an object of my invention to provide apparatus with which determinations of magnetic content may be made quickly and easily. It is a further object of my invention to provide suitable apparatus for testing materials such as asbestos, mica, glass, sand, various other minerals, various insulating materials, and the like. It is also an object of my invention to provide a device suitable for testing material in bulk. Other and further objects will become apparent as the description proceeds.

In accordance with my invention in its preferred form, I employ a magnetizing winding energized by a source of alternating current and a pair of axially displaced secondary windings surrounded by said magnetizing winding. Means are provided for supporting a specimen to be tested within one of the secondary windings. The secondary windings are connected in opposition and a current-responsive device connected to the secondary windings serves to indicate the percentage of magnetic material contained in the specimen as a result of the unbalance produced by the magnetic material which is in inductive relation with only one of the secondary windings. In order that bulk material such as asbestos may be tested, a suitable container or cartridge is provided, and means are provided for supporting the container in a fixed relation with respect to the secondary winding. The features of my invention which I believe to be novel and patentable will be pointed out in the claims appended hereto.

Figure 1:
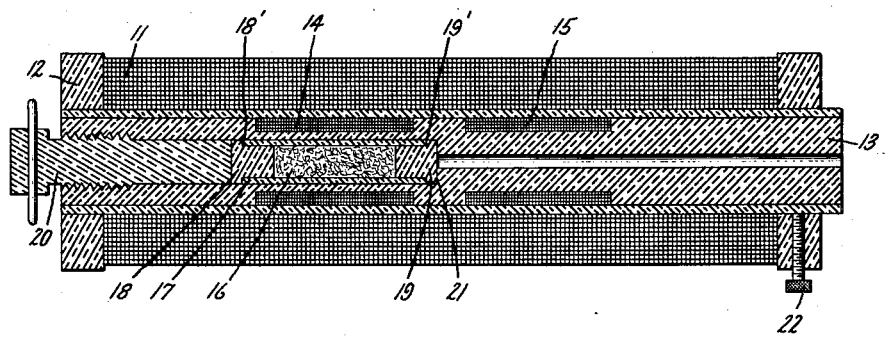
Figure 2:
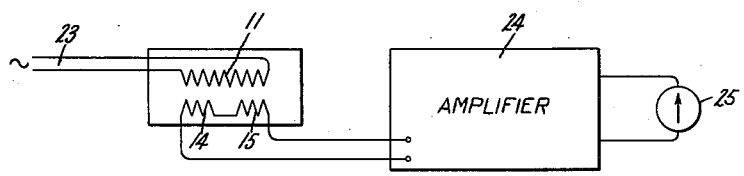

For a more complete understanding of my invention reference may be had to the following description taken in connection with the accompanying drawing in which Fig. 1 represents in cross section the construction of one form of apparatus which may be used in carrying out my invention, and Fig. 2 is a schematic diagram representing the assembled apparatus and circuit connections.

Referring now more in detail to the drawing in which like reference characters refer to like parts throughout, a suitable apparatus for carrying out my invention may consist of magnetizing winding 11 supported by a suitable form 12 surrounding a core 13 of any suitable non-magnetic material, for example, a moldable material such as a phenolic condensation product. The core 13 supports a pair of secondary windings 14 and 15 in a fixed position with respect to the magnetizing winding. A sample 16 of the material to be tested is supported within the secondary winding 14 in a fixed position with respect thereto by providing a suitable recess therefor in the core 13.

In testing solid materials a test specimen is utilized having a specific shape and size conforming to the recess provided within the apparatus. For the purpose of testing bulk material a suitable container is provided comprising a hollow cylindrical portion 17 closed at the ends by means of the movable plugs 18 and 19 having shoulders 18' and 19' which determine the normal position of the plugs with respect to the cylinder 17. The bulk material 16 to be tested is placed within the hollow cylinder and the container is inserted in the recess in the core 13. A suitable plug 20 is provided to close the opening and may, if desired, be threaded in order that the removable plugs 18 and 19 may be driven into the hollow cylinder 17 to their normal position for the purpose of compressing the tested material 16 to a fixed volume. The shoulder 21 against which the container or the sample is held by means of the threaded plug 20 serves to maintain the sample in a fixed position with relation to the secondary windings.

The secondary windings are preferably normally balanced, and a screw 22 of magnetic material may be provided if desired for obtaining a balance by threading the screw 22 into or out of the form 12 as may be required in order to modify the flux distribution sufficiently. The winding 11 is energized by a suitable source of alternating current 23 and preferably an amplifier 24 is interposed between the circuit of the windings 14 and 15 and a suitable indicating device 25 which may, if desired, be calibrated directly in percentage of iron content. In order to calibrate the device, a number of samples may be provided having known percentages of iron determined by chemical analysis, for example. Preferably, the iron content of the series of standard specimens is in the same form as in the test samples. For example, if the test samples contain iron in the form of $Fe_3O_4$, the standard specimens using the calibrating device should preferably also contain iron in the form of $Fe_3O_4$. However, if desired, the standard specimens containing $Fe_3O_4$, for example, may be used in calibrating a device for all tests, and in this case the test results will be obtained in terms of the equivalent percentage in the form of $Fe_3O_4$.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A device for testing the content of magnetic substance in a bulk material which comprises a source of alternating current, a magnetizing winding energized thereby, a pair of axially displaced secondary windings connected in opposition and surrounded by said magnetizing winding, means for supporting a container for material to be tested within one of said secondary windings, means for compressing the material within said container to a specified volume, and means responsive to unbalance in said secondary windings.

2. Means for testing the content of magnetic substance in a bulk material which comprises a source of alternating current, a magnetizing winding energized thereby, a pair of axially displaced secondary windings connected in opposition and surrounded by said magnetizing winding, a container for material to be tested comprising a hollow cylinder and a pair of plugs adapted to be inserted a fixed distance into the ends thereof, means for supporting said container in a fixed position within one of said secondary windings, means for driving said end plugs into said hollow cylinder while the container is supported within said secondary winding for the purpose of compressing the material to a fixed volume, and current responsive means connected to said secondary windings serving to provide an indication of the magnetic content of the sample in response to electrical unbalance produced thereby.

3. A device for testing the content of magnetic material in a specimen of non-magnetic material which comprises a source of alternating current, a magnetizing winding energized thereby, a pair of normally balanced axially displaced secondary windings surrounded by said magnetizing winding and electrically connected in opposition, a bar of magnetic material transverse to the axis of said magnetizing winding at one end thereof adapted to be moved transversely to said axis for the purpose of modifying the flux distribution produced by said magnetizing winding thereby adjusting the balance of said secondary windings, means for supporting a specimen to be tested within one of said secondary windings, and means responsive to unbalance in said secondary windings, thereby providing an indication of the magnetic content of the specimen.

BENJAMIN M. SMITH.